(12) United States Patent
Sciacca et al.

(10) Patent No.: US 11,808,698 B2
(45) Date of Patent: Nov. 7, 2023

(54) ANALYTE DETECTOR WITH NANO-ANTENNAS

(71) Applicant: Nederlandse Organisatie voor toegepast-natuurwetenschappelijk onderzoek TNO, 's-Gravenhage (NL)

(72) Inventors: Beniamino Sciacca, Marseilles (FR); Arjen Boersma, Haaren (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 373 days.

(21) Appl. No.: 17/255,823

(22) PCT Filed: Jun. 27, 2019

(86) PCT No.: PCT/NL2019/050395
§ 371 (c)(1),
(2) Date: Dec. 23, 2020

(87) PCT Pub. No.: WO2020/009567
PCT Pub. Date: Jan. 9, 2020

(65) Prior Publication Data
US 2021/0278340 A1    Sep. 9, 2021

(30) Foreign Application Priority Data

Jul. 6, 2018  (EP) .................................. 18182298

(51) Int. Cl.
*G01N 21/3504* (2014.01)
*G01N 21/21* (2006.01)
(Continued)

(52) U.S. Cl.
CPC ......... *G01N 21/3504* (2013.01); *G01N 21/21* (2013.01); *G01N 21/554* (2013.01); *G01N 21/658* (2013.01)

(58) Field of Classification Search
CPC .. G01N 21/3504; G01N 21/21; G01N 21/554; G01N 21/658
See application file for complete search history.

(56) References Cited

U.S. PATENT DOCUMENTS 7,460,224 B2 * 12/2008 Wang .................. G01N 21/648
356/301
9,983,124 B2 *  5/2018 Wang ................. B01J 20/28097
(Continued)

FOREIGN PATENT DOCUMENTS

| EP | 2372343 A1 | 10/2011 |
|---|---|---|
| JP | 2006-088088 A | 4/2006 |
| WO | WO 2009/022246 A1 | 2/2009 |

OTHER PUBLICATIONS

European Patent Office, International Search Report in corresponding International Application No. PCT/NL2019/050395, dated Oct. 25, 2019 (3 pages).
(Continued)

*Primary Examiner* — David P Porta
*Assistant Examiner* — Meenakshi S Sahu
(74) *Attorney, Agent, or Firm* — Leydig, Voit & Mayer, Ltd.

(57) ABSTRACT

A device for the detection of analytes comprises a substrate (10) with nano-antennas (11,12). The nano-antennas (11,12) comprise an antenna material (11m, 12m) for forming resonant antenna structures which receive and resonantly interact with source light (L0) to form respective resonance peaks (R1,R2) over a resonant wavelength range (A1,A2) overlapping respective signature wavelength ($\lambda$1,$\lambda$2) of a target analyte (A). The resonant interaction causes a locally concentrated field (Ec) of the source light (L0) in the resonant wavelength range ($\Lambda$1,$\Lambda$2). The concentrated intensity (Ic) is localized around a respective target location (T1,T2) which is provided with a sorption material (11s,
(Continued)

US 11,808,698 B2

Page 2

12s) that sorbs the target analyte (A). This provides a locally increased analyte concentration (Ac) of the target analyte (A) coinciding with the locally concentrated field (Ec) of the source light (L0). Accordingly, the interaction of the source light (L0) with the target analyte (A) is enhanced.

17 Claims, 9 Drawing Sheets

(51) Int. Cl.
  *G01N 21/552* (2014.01)
  *G01N 21/65* (2006.01)

(56) References Cited

U.S. PATENT DOCUMENTS

| | | | |
|---|---|---|---|
| 2006/0115536 A1* | 6/2006 | Yacaman | B82Y 30/00 424/618 |
| 2012/0058697 A1 | 3/2012 | Strickland et al. | |
| 2013/0148194 A1 | 6/2013 | Altug et al. | |
| 2014/0264026 A1 | 9/2014 | Brown et al. | |

OTHER PUBLICATIONS

Ivan S. Maksymov et al., "Optical Yagi-Uda Nanoantennas," Nanophotonics, vol. 1, No. 1, pp. 65-81, XP055220503 (Jan. 1, 2012).

Xinyuan Chong et al., "Surface-Enhanced Infrared Absorption Pushing the Frontier for On-Chip Gas Sensing," ACS Sens., 3, pp. 230-238 (2018).

\* cited by examiner

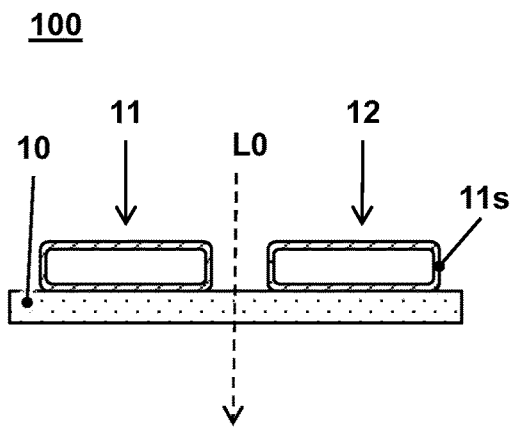
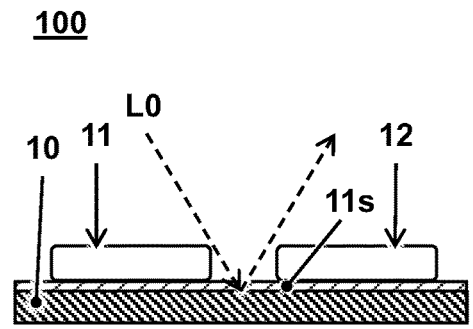
FIG 6A  FIG 6B
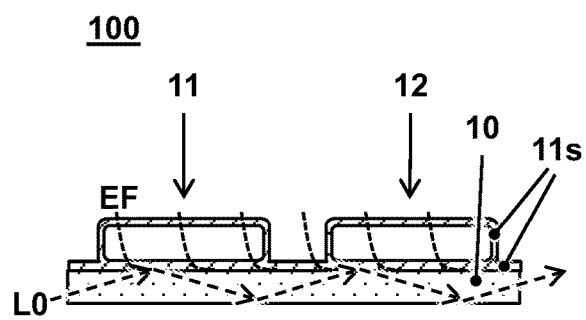
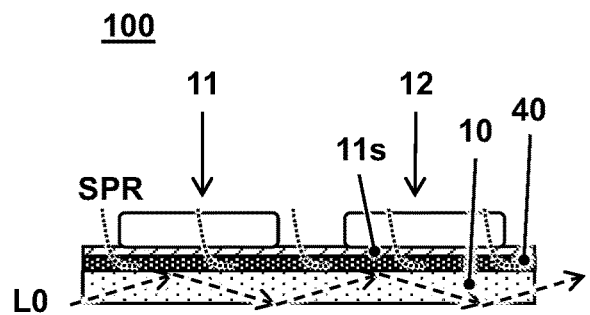
FIG 6C  FIG 6D

ANALYTE DETECTOR WITH NANO-ANTENNAS

CROSS-REFERENCE TO RELATED APPLICATIONS

This patent application is a U.S. National Phase of PCT International Application No. PCT/NL2019/050395, filed Jun. 27, 2019, which claims priority to European Application No. 18182298.2, filed Jul. 6, 2018, which are both expressly incorporated by reference in their entireties, including any references contained therein.

TECHNICAL FIELD AND BACKGROUND

The present disclosure relates to an analyte detector and method of detecting analytes by means of nano-antennas.

As background, Xinyuan Chong et al. [ACS Sensors 2018, 3, 230-238] describe a suspended silicon nitride (Si3N4) nanomembrane device by integrating plasmonic nanopatch gold antennas with metal-organic framework (MOF), which can largely adsorb carbon dioxide (CO2) through its nanoporous structure. Unlike conventional SEIRA sensing relying on highly localized hot-spots of plasmonic nanoantennas or nanoparticles, the device reported in this paper engineered the coupled surface plasmon polaritons in the metal-Si3N4 and metal-MOF interfaces to achieve strong optical field enhancement across the entire MOF film. The paper reports on-chip gas sensing of CO2 with more than 1800× enhancement factors by combining the concentration effect from the 2.7 μm MOF thin film and the optical field enhancement of the plasmonic nanopatch antennas.

There is yet a desire to extend detection capabilities of known analyte detectors, e.g. distinguish different analytes, enhancing the sensitivity, and reducing the limit of detection.

SUMMARY

Aspects of the present disclosure relate to an analyte detector and corresponding method of detecting analytes. The detector comprises one or more substrates with a plurality of nano-antennas e.g. disposed on their surface. The detector is configured to receive a target analyte with a spectral signature having absorption peaks at signature wavelengths. The detector may also receive source light from an integrated or separate light source. The source light has a source intensity over a source wavelength range suitable for interaction with the target analyte at the signature wavelengths according to the spectral signature. The nano-antennas comprise an antenna material forming resonant antenna structures configured to receive and resonantly interact with the source light to form a respective resonance peak over a resonant wavelength range overlapping a respective signature wavelength of the target analyte. The resonant interaction may cause a locally concentrated field of the source light particularly in the resonant wavelength range. The concentrated intensity may be localized around a respective target location of the nano-antennas and/or substrate. The target location is provided with a sorption material for absorbing or adsorbing the target analyte to provide a locally increased analyte concentration of the target analyte. Advantageously, the increased analyte concentration may coincide with the locally amplified field of the source light for enhancing the interaction of the source light with the target analyte.

Preferably, the detector is provided with different nano-antennas. In particular, the different antennas may provide respective resonance peaks in different resonant wavelength ranges. The different nano-antennas may have different antenna structures, e.g. wherein the structures differ by one or more of a different size, orientation, shape, and/or antenna material. For example, a different size of the antennas, e.g. different length, diameter, or other characteristic dimension may be correspond to a different resonant wavelength of the light. For example, a different orientation of the antennas may determine an overlap with a particular polarization of the light in the direction of the antennas. Antennas may also have different dimensions in different directions to provide different resonances for different polarizations of the light. For example, a different shape or material of the antennas may also affect their respective resonances.

By combining different antenna resonances, the wavelength range covered by a single type of antenna can be extended. For example, two different antennas may provide respective resonances which are completely separate to cover absorption bands of the analyte with entirely different wavelengths. Alternatively, or additionally, the resonances of different antennas may partly overlap to provide a continuous detection range over which a relatively large part of the spectral signature can be measured.

By providing the same sorption material at target location associated with different antennas, concentrations of the same analyte may simultaneously or consecutively be exposed to different resonances of the light. By combining the measurements at the different resonance frequencies, an extended enhanced spectral signature can be composed. For example, light may traverse a path wherein it simultaneously or consecutively interacts with the different antennas. Each one or more antennas along a respective light path may resonantly interact with the light e.g. causing absorption or scattering of the resonant light. This may be measured as resonance dips and/or peaks in the spectrum of transmitted and/or reflected light. Absorption of the analyte at the respective resonances may affect the spectrum particularly at the resonance dips and/or peaks. This coupling may result in parts of the spectral signature of the analyte appearing superimposed over the resonance dips and/or peaks of the antennas. For example, a resonance of the analyte may cause some increase or decrease of the transmitted light in the resonance of the antenna.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 6a-6D illustrates cross-section side views of various operational modes of an analyte detector;

DESCRIPTION OF EMBODIMENTS

Figure 1A:
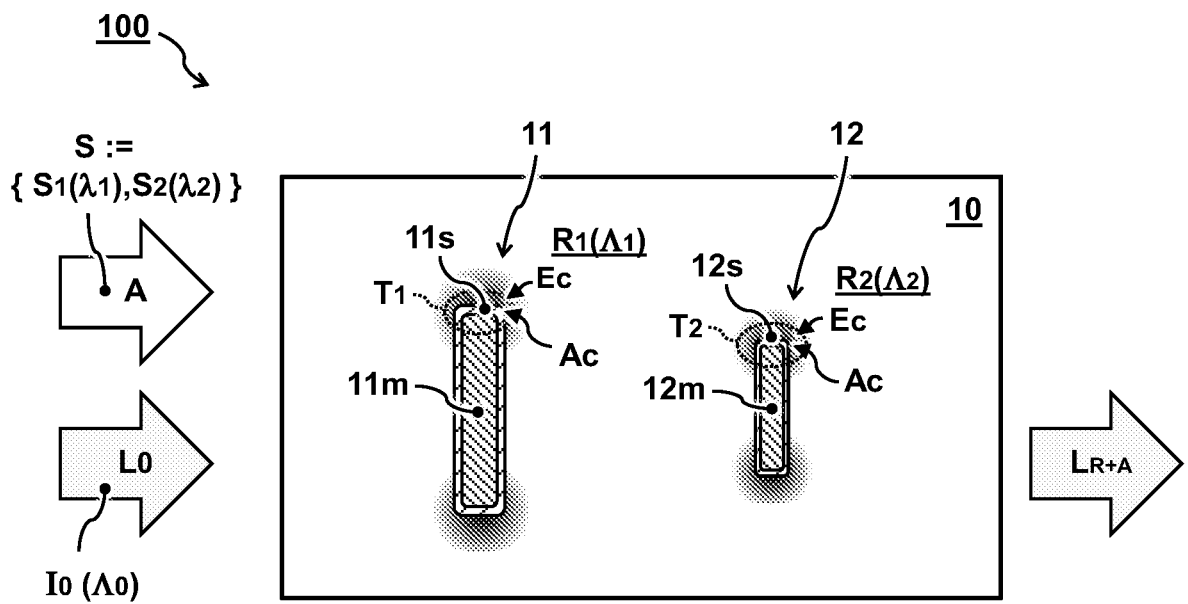
FIG. 1A schematically illustrates a substrate with nano-antennas as part of an analyte detector.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

As used herein, sorbing or sorption may refer to the take up and holding of analytes by adsorption or absorption. Adsorption in the context of analytes typically refers to adhesion in a layer of molecules (as gases, solutes, or liquids, e.g. analytes) to the surfaces of solid bodies or liquids with which they are in contact. Absorption in the context of analytes typically refers to the process of absorbing, e.g. taking in, of molecules (such as gases, solutes, or liquids, e.g. analytes) into solid bodies or liquids with which they are in contact, for example by chemical bonding or dissolution processes.

As used herein, spectroscopy relates to the interaction of electromagnetic radiation with matter, e.g. based on absorption spectroscopy. Using spectroscopic techniques, unknown chemical compound and or moieties may identified, e.g. qualitatively detected based on their spectral signature. Quantification of analytes is also possible and typically involves a calibration routine which may include recording absorption spectra of the respective compounds with known concentrations or reference to pre-determined values. For example, pre-determined values may be stored in a storage medium or database or calculated e.g. based on model values. Samples may be solid, liquid, or gas. Infrared (IR) spectra are typically displayed in a graph with absorbance (or transmittance) of infrared light on the vertical axis and frequency or wavelength on the horizontal axis. Typical units of frequency used in IR spectra are reciprocal centimeters (also called wave numbers), with the symbol $cm^{-1}$. Units of IR wavelength are commonly given in micrometers (µm), which are inversely related to wave numbers.

As used herein, surface plasmon resonance (SPR) relates to the resonant oscillation of electrons at the interface between a negative and positive permittivity material, wherein the resonant oscillation may be stimulated by incident light.

As used herein analytes or target analytes may relate to one or more individual constituents, or groups of related constituents in a sample under investigation by the analyte detector. Analytes may be solid, liquid, or gas. Typically analytes may be gaseous or vapors. For example, humidity, carbon dioxide or volatile organic vapors such as benzene, toluene or the group of xylenes.

As used herein an analyte detector is any device or component suitable for directly or indirectly detecting analytes. For example, analytes may be detected by their spectral signature, e.g. the effect of absorption bands on a spectrum of source light interacting with the analytes. For example, the substrate with nano-antennas may form a component of a larger detector device which may also comprise or otherwise couple to, e.g. a light source, light detector, spectral resolving element, controller, data storage, et cetera.

As used herein the term nano-antennas may relate to antennas having relatively small dimensions, e.g. with at least one dimension smaller than the wavelength, to allow resonantly interaction with incident light. Typically antenna may comprise an electrically conductive material. Also semiconducting materials may be used in some cases. The resonance may be described by the position of the resonance peak, e.g. the wavelength or frequency of the light the antenna resonantly interacts with. Alternatively or in addition the resonance may be described by the width of the resonance peak, i.e. the wavelength range the antenna resonantly interacts with. A resonant antenna may be formed by a single element, e.g. a dot or a wire/rod. The also an array elements may act as an antenna to collectively provide a resonant interaction with light. For example, an array of dots or an arrangement of parallel rods in a particular arrangement such as a Yagi-Uda arrangement may form a resonant antenna. In such arrays or arrangements the elements constituting the antenna are typically closely spaced, for example the elements may be spaced by a distance less than the wavelength at which the antenna resonates.

The resonance, e.g. peak positon and/or width, of a nano-antenna may be influenced by one or more of the material, dimension, or geometry of the antenna, and by one or more of the number, material, dimension, geometry of sub-elements, if any. In addition spacing between antennas and/or elements may influence the resonance. A typically used geometry for antennas as used herein is a wire or rod shape. Also other shapes such as rectangular beams can be used, e.g. wherein characteristics such as the length, thickness, and/or width can be controllably varied between different antennas. Alternatively antennas may comprise differently shapes elements, e.g. dots or squares. When reference is made to a size of the antenna it will be understood that this may refer to at least one of the typical dimensions of the antenna. For example, for wire-shape antennas a typical dimension may be the length or diameter of the wire, whereas for dots or array of dots a typical dimension may be the diameter of a dot and or the spacing between adjacent dots in an array. Alternatively, different or complex shaped antennas may have other characteristic dimensions determining their resonance wavelength.

When reference herein is made to a number or plurality of different antennas this may relate to a number of antennas which are configured to resonate with incident light wherein the resulting resonance occurs at different wavelengths, e.g. different peak positions and/or peak widths of the resonance.

Typically, the different positions may relate to various absorption bands in the absorption spectra of target analytes. For example, the resonance of different antennas may be spread to cover a continuous or discontinuous frequency range of more than 100 cm$^{-1}$, preferably more than 200 cm$^{-1}$, more than 500 cm$^{-1}$, more than 1000 cm$^{-1}$, or even more, e.g. a parts of the frequency range between 500-4000 cm$^{-1}$ may included various sparsely distributed characteristic absorption peaks of benzene or other volatile compounds. For example, a first antenna may provide a resonance peak centered at a first wavelength and a different second antenna may provide a resonance peak centered at a second wavelength which differs from the first wavelength by a factor of more than 1.1, 1.5, 2, 5, 10 or more.

By providing exemplary wire-shape antennas with different lengths resonant interaction in such range may be realized. For example, a plurality of wire-shaped antennas may comprise a first antenna with a length differing from the length of second antenna by a factor 1.05, alternatively by a factor of 1.1, or 1.5, 2, 5, or even larger numbers such as 10. For example, a wire shaped nano-antenna may have a length in a range between three hundred nanometer and fifty micrometer, in a range between one micrometer and ten micrometer, in a range between two micrometer and five micrometer, for example three micrometer. Alternatively or in addition antenna may differ in one or more of its material, dimension, geometry, and/or by one or more of the material, dimension, geometry of sub-elements, or one or more of the spacing and orientation of antennas and/or sub-elements.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A depicts a top view representation of an analyte detector 100 comprising a substrate 10 with a plurality of nano-antennas 11,12.

In one embodiment, the nano-antennas 11,12 are configured to receive one or more types of target analyte "A" with a spectral signature "S" with absorption peaks S1,S2 at signature wavelengths λ1,λ2. In another or further embodiment, e.g. as shown, the antennas receive source light L0 with a source intensity I0 over a source wavelength range Λ0. The source light L0 can be linearly polarized or unpolarized or circularly polarized or elliptically polarized. may interact with the target analyte "A" at the signature wavelengths λ1,λ2 according to the spectral signature "S". By interacting with a target analyte "A", the source light L0 may exchange energy with the target analyte "A". One effect of this energy exchange may be that the light $L_{R+A}$ leaving the nano-antennas 11,12 after interacting with target analyte "A" may comprise information relating to the spectral signature "S" of the target analyte "A". The exchange of energy may be constructive and/or destructive. In other words, the incident field polarizes the nanoantennas, that generate an enhanced near field that excites the target analyte "A", which as a back action excites back the nanoantennas. Depending on the phase delay of such interaction, absorption peaks or dips can be observed.

Preferably, the nano-antennas 11,12 comprise an antenna material 11m,12m forming resonant antenna structures configured to receive and resonantly interact with the source light L0 to form a respective resonance peak R1,R2 over a resonant wavelength range Λ1,Λ2. Typically, the resonant interaction may cause a locally concentrated field "Ec", e.g. with relatively high electric field strength, of the source light L0 in the resonant wavelength range Λ1,Λ2. For example, the concentrated field "Ec" may be localized around a respective target location T1,T2 of the nano-antennas 11,12 and/or substrate 10, as shown. The position and range of resonant interaction may be influenced by one or more of the material, dimension, and geometry of the antenna, and/or by one or more of the material, dimension, geometry of sub-elements of the antenna, if any. In addition, spacing between antennas and/or elements may influence the resonance. By configuring the nano-antennas 11,12 to resonantly interact with the source light L0 to form a respective resonance peak R1,R2 at a certain position over a certain resonant wavelength range Λ1,Λ2 an overlap with a respective signature wavelength Λ1,Λ2 of the target analyte "A" may be attained.

In another or further embodiment the analyte detector is provided wherein, at least some of the resonance peaks of different nano-antennas cover exclusive wavelength ranges, e.g. a full width half maximum of a first resonance peak has no overlap with a full width half maximum of a second resonance peak. In another or further embodiment the analyte detector 100 is provided, wherein at least some of the resonance peaks R4,R5 of different nano-antennas cover partially overlapping wavelength ranges Λ4,Λ5, e.g. a full width half maximum of a first resonance peak R1 partially overlaps between 5-95% of a full width half maximum of a second resonance peak R2.

Figure 1B:
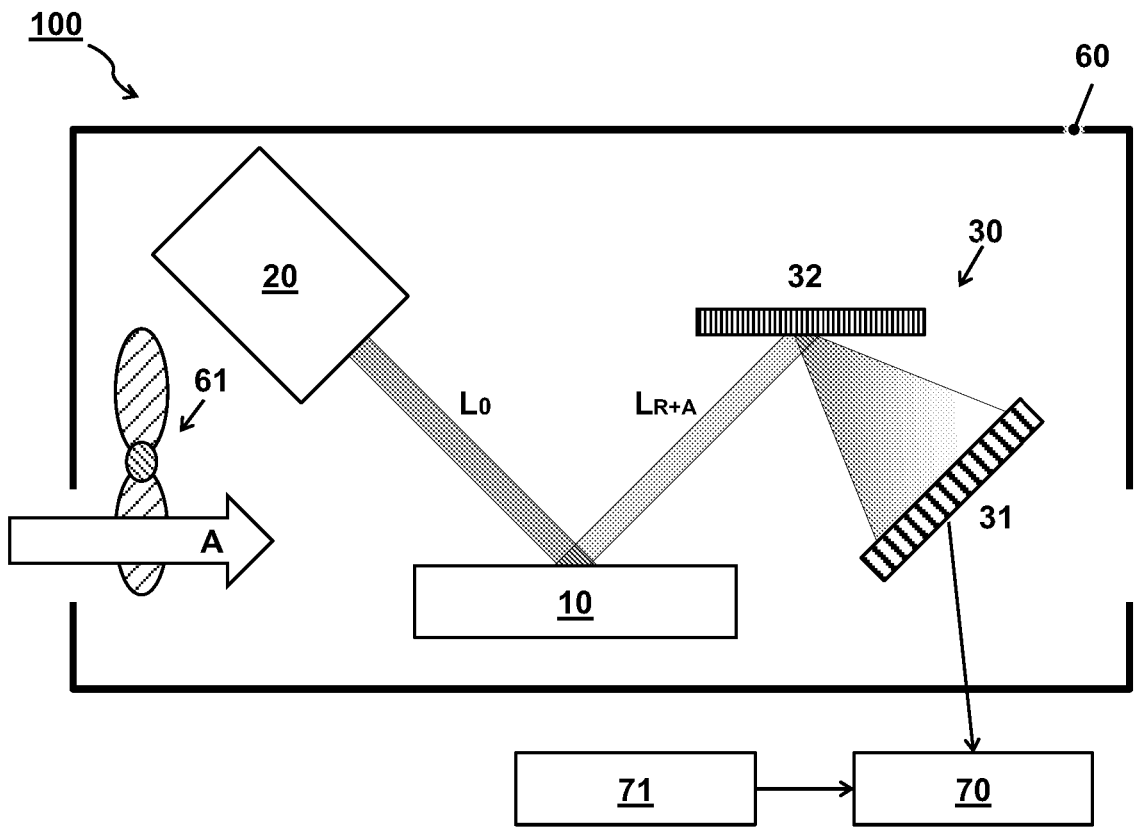
FIG. 1B schematically illustrates further components which may be part of or otherwise related to an analyte detector.

In some embodiments, the analyte detector 100 according is provided, comprising a light sensor 30 (FIG. 1B). Accordingly, the light may travel along one or more specific light paths from the light source 20 to the light sensor 30. Preferably, the nano-antennas 11,12 are arranged along most if not all of the said one or more light paths. In a preferred embodiment, a majority if not all of the one or more light paths are configured to have the light interact with at least two different nano-antennas 11,12. For example, light may interact consecutively with two different antennas at consecutive positions along the light path. As will be explained later with reference to FIGS. 9A and 9B, signal to noise ratio may be improved in some cases if the light interacts with multiple different antennas on its path between the light source and sensor, compared to a case where the signal is formed from a combination of two fractions, the first of which allowed to interact with a first antenna and the second of which allowed to interact with a second antenna. Accordingly, it may be preferred that the one or more light paths are arranged to allow a significant fraction of the light to interact with at least two, preferably all of the different types of antennas before arriving at the sensor, e.g. wherein the fraction is at least one percent, at least five percent, at least ten percent, at least twenty percent, at least fifty percent, or more, up to hundred percent. The higher the fraction of multiple antenna interactions, the better may be the signal to noise. In another or further embodiment, the light path may be configured to have the light interact simultaneously with at least two different nano-antennas 11,12. In some embodiments, the antennas may be arranged to support resonances at different polarization of the incoming light, to preserve a large signal to noise ratio; or in alternative arranged to support resonances for the same polarization.

In another or further preferred embodiment, the analyte detector 100 is provided, wherein at least part of the light path is formed by an optical wave guide 15 configured to guide the light L along the different nano-antennas 11,12. By providing the light path with an optical wave guide 15 configured to guide the light L along the different nano-antennas 11,12 the light may be guided first along the first type of antenna, then along the second different type of antenna, so the light is allowed to interact with both antenna types.

In other or further preferred embodiments, the light path may be configured to reflect multiple times between substrates 10 to have the light consecutively interact with at least two different nano-antennas 11,12.

In other or further preferred embodiments the analyte detector 100 may comprise at least two different areas on the at least one substrate, each provided with respective types of antennas, wherein the light path is configured to guide the light L along the different areas to interact with at least two different nano-antennas 11,12. For example, the respective types of antennas may be disposed on different substrates, e.g. each substrate being provided with in majority one type of antennas. Alternatively, the respective types of antennas may be disposed on separates areas on a single substrate. By disposing the respective antennas on two reflective substrates the light L may be directed to the different nano-antennas 11,12 by reflecting the light from between substrates. Alternatively or in addition, the respective antennas may be disposed on transmissive substrates, e.g. effectively transparent in the corresponding wavelength range. By disposing the respective antennas on transparent substrates the light L may be directed to the different nano-antennas 11,12 by passing trough a first substrate towards a second substrate. It will be appreciated that combinations of transmissive and reflective surfaces and/or in combination with waveguides are envisioned as well.

In the exemplary embodiment, e.g. as shown in FIG. 1A, the target location T1,T2 is provided with a sorption material 11s,12s for sorbing the target analyte "A" to provide a locally increased analyte concentration "Ac" of the target analyte "A" coinciding with the locally concentrated field "Ec" of the source light L0. By providing the analyte detector 100 with a target location T1,T2 in which the increased analyte concentration "Ac" and locally concentrated field "Ec" at least in part overlap, an effect may be that the interaction of the source light L0 with the target analyte "A" is enhanced.

Preferably, the different nano-antennas 11,12 with the same sorption material 11s,12s in their respective target locations T1,T2 are configured to provide respective resonance peaks L1,L2 in different resonant wavelength ranges Λ1,Λ2. Preferably at least one or more of these ranges overlap with different signature wavelengths λ1,λ2 of the spectral signature "S" of target analyte "A". By overlapping one or more resonant wavelength ranges Λ1,Λ2 with one or more signature wavelengths λ1,λ2 of the spectral signature "S" of target analyte "A" energy may be exchanged between source light L0 and the target analyte "A", thereby transferring spectral information of the target analyte "A" to the source light L0. By overlapping with more than one signature wavelengths λ1,λ2 of the spectral signature "S" of target analyte "A" more spectral information of target analyte "A" may be transferred to source light L0. After interacting of the source light L0 with the target analyte "A", light $L_{R+A}$ may be directed towards a detector.

In a preferred embodiment, a method of detecting analytes is provided. For example, the method comprises one or more of providing at least one substrate 10 with a plurality of nano-antennas 11,12; receiving a target analyte "A" with a spectral signature "S" having absorption peaks S1,S2 at signature wavelengths λ1,λ2; receiving source light L0 with a source intensity I0 over a source wavelength range Λ0 at the nano-antennas 11,12 for interaction with the target analyte "A" at the signature wavelengths λ1,λ2 according to the spectral signature "S", wherein the nano-antennas 11,12 comprise an antenna material 11m,12m for forming resonant antenna structures which receive and resonantly interact with the source light L0 to form a respective resonance peak R1,R2 over a resonant wavelength range Λ1,Λ2 overlapping a respective signature wavelength λ1,λ2 of the target analyte "A", wherein the resonant interaction causes a locally concentrated field "Ec" of the source light L0 in the resonant wavelength range Λ1,Λ2, wherein, the concentrated field "Ec" is localized around a respective target location T1,T2 of the nano-antennas 11,12 and/or substrate 10; providing the target location T1,T2 with a sorption material 11s,12s that sorbs the target analyte "A" to provide a locally increased analyte concentration "Ac" of the target analyte "A" coinciding with the locally concentrated field "Ec" of the source light L0 thereby enhancing the interaction of the source light L0 with the target analyte "A"; wherein different nano-antennas 11,12 with the same sorption material 11s,12s in their respective target locations T1,T2 provide respective resonance peaks L1,L2 in different resonant wavelength ranges Λ1,Λ2 to overlap different signature wavelengths λ1,λ2 of the spectral signature "S".

By providing different nano-antennas 11,12 configured to resonantly interact with source light L0 to respective resonance peaks L1,L2 in different resonant wavelength ranges Λ1,Λ2 to overlap different signature wavelengths λ1,λ2 of the spectral signature "S" an effect may be that a larger portion of the spectral information of target analyte "A" is transferred to source light L0. An effect of transferring larger portion of the spectral information of target analyte "A" to the source light L0 may be that the light leaving the analyte detector 100 may be used to identify the presence of target analyte "A" in a mixture comprising further analytes.

In another or further embodiment, e.g. as shown, an analyte detector 100 is provided comprising at least one substrate 10 with a plurality of nano-antennas 11,12 configured to receive a target analyte "A" with a spectral signature "S" having absorption peaks S1,S2 at signature wavelengths Λ1,Λ2, and to receive source light L0 with a source intensity I0 over a source wavelength range Λ0 for interaction with the target analyte "A" at the signature wavelengths λ1,λ2 according to the spectral signature "S", wherein the nano-antennas 11,12 comprise an antenna material 11m,12m forming resonant antenna structures configured to receive and resonantly interact with the source light L0 to form a respective resonance peak R1,R2 over a resonant wavelength range Λ1,Λ2 overlapping a respective signature wavelength λ1,λ2 of the target analyte "A". As described above the resonant interaction between the source light L0 and the nano-antennas 11,12 may be controlled by one or more of the material, dimension, and geometry of the antenna, and/or by one or more of the material, dimension, geometry of sub-elements of the antenna, if any. In addition, spacing between antennas and/or elements may influence the resonance.

By providing a resonant interaction between source light L0 and the nano-antennas 11,12, a locally concentrated field "Ec" of the source light L0 in the resonant wavelength range Λ1,Λ2 may be formed. Preferably, the concentrated field "Ec" is localized around a respective target location T1,T2 of the nano-antennas 11,12 and/or substrate 10. Preferably, the target location T1,T2 may be provided with a sorption material 11s,12s for sorbing. By sorbing the target analyte "A" in a sorption material an effect may be that target analyte "A" is provided with a locally increased concentration "Ac". The sorbing material does not need to be specific towards analyte but can sorb different target analytes, or can be a mixture of sorbing materials.

Preferably, the increased analyte concentration "Ac" of the target analyte "A" coincides with the locally concentrated field "Ec" of the source light L0 for enhancing the interaction of the source light L0 with the target analyte "A". An effect of at least partly coinciding an locally concentrated field "Ec" and increased analyte concentration "Ac" may be an improved interaction between source light L0 and the target analyte "A", e.g. a larger portion of the spectral information of target analyte "A" is transferred to source light L0. An effect of transferring a larger portion of the spectral information of target analyte "A" to the source light L0 may be that the light leaving the analyte detector 100 may be used to identify the presence of target analyte "A". In one embodiment, e.g. as shown, the different nano-antennas 11,12 with the same sorption material 11s,12s in their respective target locations T1,T2 are configured to provide respective resonance peaks L1,L2 in different resonant wavelength ranges Λ1,Λ2 to overlap different signature wavelengths λ1,λ2 of the spectral signature "S". By providing different nano-antennas 11,12 configured to resonantly interact with source light L0 to respective resonance peaks L1,L2 in different resonant wavelength ranges Λ1,Λ2 to overlap different signature wavelengths λ1,λ2 of the spectral signature "S" an effect may be that a larger portion of the spectral information of target analyte "A" is transferred to source light L0. An effect of transferring larger portion of the spectral information of target analyte "A" to the source light L0 may be that the light leaving the analyte detector 100 may be used to identify the presence of target analyte "A" in a mixture comprising further analytes.

FIG. 1B depicts a schematic side view of another or further embodiment, e.g. as shown, of an analyte detector 100 comprising a light source 20 and a detector 30. The analyte detector 100 may be operated in reflection mode, as shown. By using a reflection mode, light coming from a light source 20 above the substrate may be reflected towards a detector 30 positioned at the same side of the substrate. Other modes and respective advantages thereof, including but not limited to transmission, the use of optical waveguides, and the use of surface plasmon resonance, may be used alternatively or in addition, as will be described later. In addition, the analyte detector 100 may be enclosed in a housing 60 provided with at least an inlet for target analyte A. The 60 may be further provided with an outlet for removing target analyte A. Said in and/or outlets may be closable. An effect of providing the housing 60 with closable openings may be that in a closed position the concentration of target analyte "A" may be stable which may be used to equilibrate the analyte detector 100. Analyte "A" may be provided to the nano-antennas 11,12 by natural flow or circulation, for example by diffusion. Alternatively, target analyte "A" may be provided to the nano-antennas 11,12 by forced flow or circulation, for example by providing a fan 61. By providing a forced flow or circulation the target analyte A may be provided quickly to and from the analyte detector 100. An effect of providing a forced flow or circulation the target analyte may be an improved response or equilibration time of the analyte detector 100 in case the concentration of target analyte A changes abruptly. Alternatively or in addition the analyte detector 100 may be built into existing air ducts, e.g. air conditioning, chemical hood, or other locations.

In another or further embodiment the light source 20 may be one or more of a narrowband light source, a tunable light source or broadband light source 20. For example the light source (20) may comprise a laser. For example, the narrowband light source may be a light emitting diode or a laser, for example a solid state laser or an external cavity quantum cascade laser EC-QCL. An advantage of using a laser may be that the source light (L0) may be focused on the analyte detector (100) without the use of additional focusing elements, and in particular it may increase the signal to noise ratio and improve the limit of detection.

Preferable the light source 20 is tunable light source so that the output wavelength of light source may be tuned to match a resonance of the nano-antennas. For example the light L may be tuned in a mid-IR range e.g. between two and thirty micrometer (µm), in a near IR range, or alternatively, depending on the spectroscopic absorption bands of the target analytes A, in other ranges such as the visible or UV range. Optionally, the light source 20 may be suited for simultaneously providing light L in a multitude of wavelength ranges. One advantage of simultaneously providing a source light L0 or multiple light sources with a multitude of wavelengths may be that simultaneous detection of target analyte "A" using different spectroscopic principles may be enabled. For example a first range may be provided corresponding to IR absorption spectroscopy and a second range corresponding to RAMAN spectroscopy. For Raman typically a laser is used, e.g. visible laser, while for IR it is not needed. For example, a typical system may be based on thermal light sources. So to combine IR and Raman, two separate sources can be used. Alternatively, the light source 20 may be a broadband light source, for example a heated filament, optionally in combination with an interferometer to select a desired wavelength range. Preferably, the light source 20 is small, for example, the light source 20 takes up less than fifty cubic centimeter ($cm^3$), preferably less than ten cubic centimeter ($cm^3$), preferably less than two cubic centimeter ($cm^3$), for example in a range between five and one cubic centimeter ($cm^3$). An effect of providing a small light source 20 is that the analyte detector 100 may be a portable analyte detector 100.

In some embodiments the light source 20 may be arranged to provide a polarized light PL. Preferably, the polarization direction of light PL corresponds to an orientation of the nano-antennas. One advantage of using polarized light may be a more efficient in-coupling of polarized light into, for example optical wave guides, or a larger signal to noise ratio. In other or further embodiments the light detector 30 may be an opto-electrical device for converting an optical energy to an electrical signal. The detector may comprise a single channel or a multi channel opto-electrical device, wherein single channel opto-electrical devices advantageously may be more sensitive. Optionally or additionally, the detector 30 may comprise a spectral resolving element 32, e.g. grating or prism or interferometer or MEMS interferometer. An effect of providing a spectral resolving element may be that a broad spectral range may be scanned through in small portions, thus enabling the use of a single channel detector. Alternatively or in addition the detector 30 may comprise position sensitive elements, e.g. a pixel detector for enabling the recoding of positional information in addition to spectral information. In other or further embodiments the analyte detector 100 comprises a spectrum analyzer 70 to receive an output to the detector 30. Advantageously, the spectrum analyzer 70 further receives an output of a data storage unit 71, wherein the data storage unit 71 holds a thereon stored a database or look-up table of spectral data of reference analytes A. An advantage of providing the spectrum analyzer 70 with spectral data of reference analytes A may be that by comparing the output of the detector 30 with spectral data of reference analytes, the presence of a target analyte "A" may be detected in a mixture comprising of a priori unidentified constituents.

Figure 2:
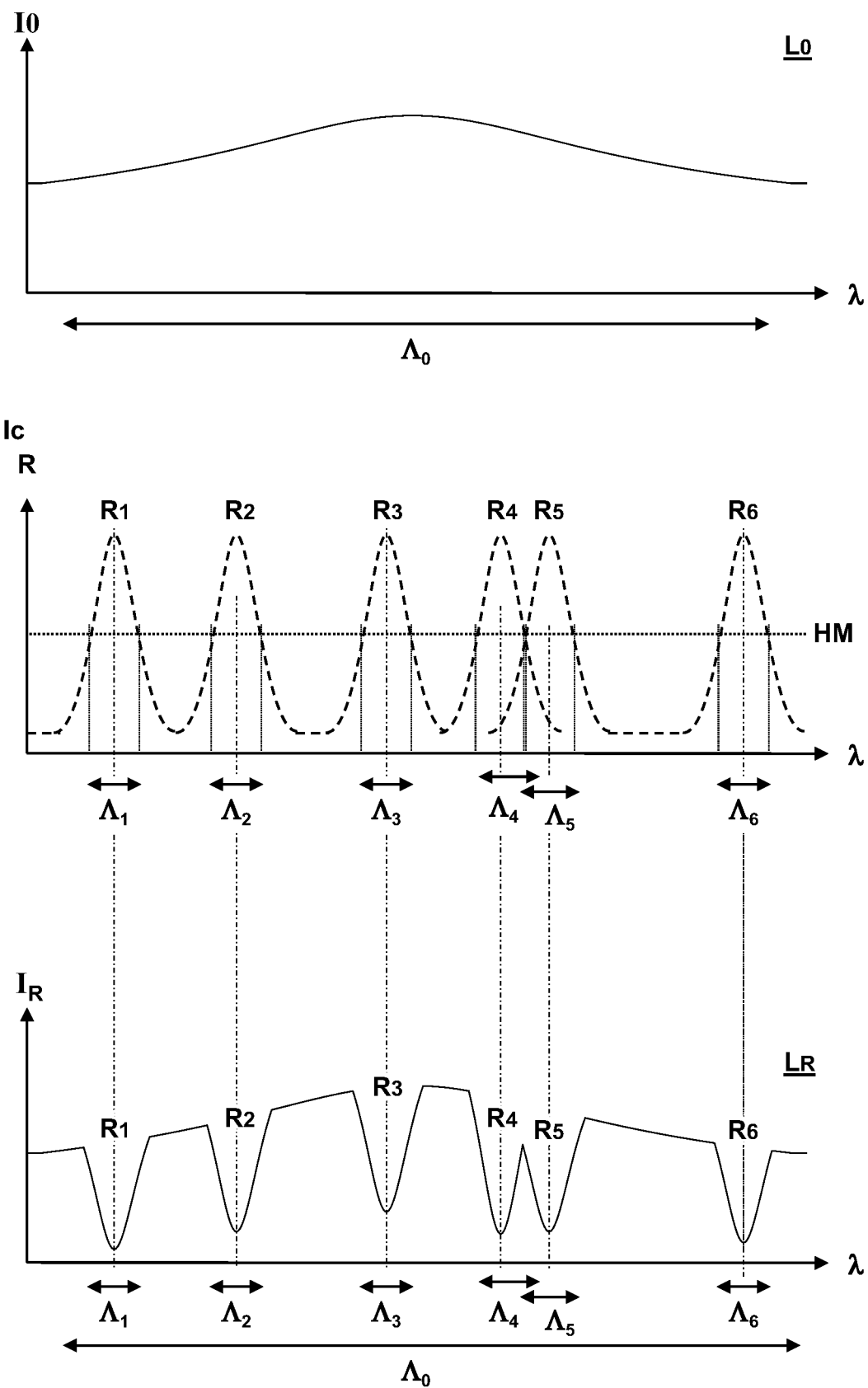
FIG. 2 illustrates spectra relating to resonant interaction of the source light with nano-antennas in the absence of analytes.

FIG. 2 illustrates exemplary spectra relating to the resonant interaction—in the absence of analytes—of source light L0 with different nano-antennas having different resonances R1-R6 each with respective wavelength ranges Λ1-Λ6.

The top part of FIG. 2 illustrates a spectrum of source light L0 having a source intensity I0 over a source wavelength range Λ0.

The middle part of FIG. 2 illustrates the resonance peaks R1-R6 of different antennas with respective wavelength ranges Λ1-Λ6. While the peaks are illustrated here as having the same intensity and width, in reality these may be different for different wavelengths. Typically, the resonance peaks may be also asymmetrical. In the schematic graph shown, the wavelength ranges Λ1-Λ6 are determined as the full width at half maximum HM. Of course, also other measures for the wavelength range of a resonance can be used, e.g. twice or three the FWHM. Instead of the half maximum HM, the width of the wavelength range may also be determined at some other factor, e.g. 10% of the maximum.

The bottom part of FIG. 2 illustrates a corresponding spectrum of a light $L_R$ resulting from resonant interaction of the source light L0 with the resonance R1-R6 of the nano-antennas.

Figure 3:
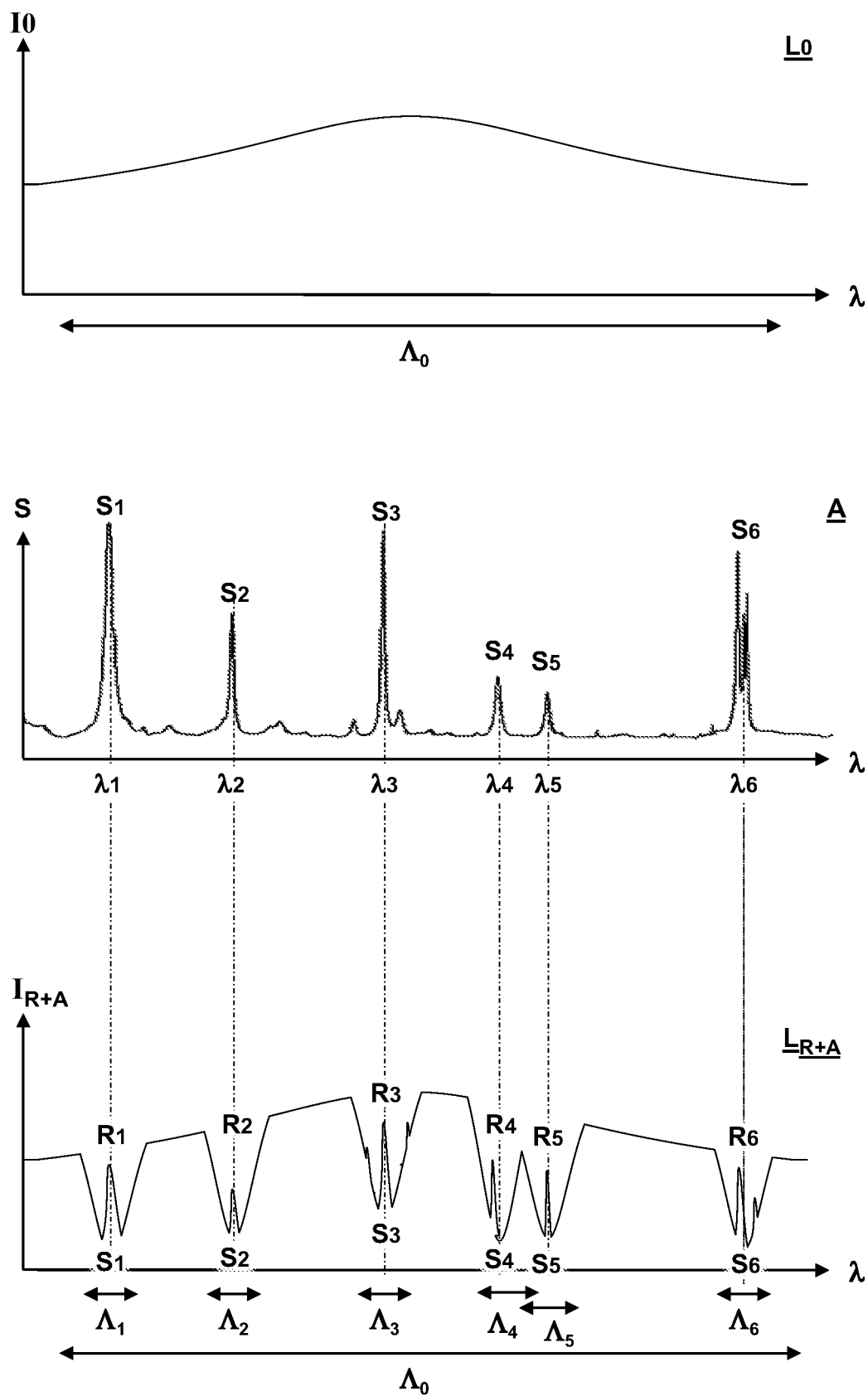
FIG. 3 illustrates spectra relating to resonant interaction of the source light with nano-antennas in the presence of analytes.

FIG. 3 illustrates spectra relating to the resonant interaction of the source light L0 with exemplary nano-antennas 11,12 provided with sorption material 11s,12s in the presence of analytes A. FIG. 3 (top) illustrates a spectrum of light source light L0 having an source intensity I0 over a source wavelength range Λ0. FIG. 3 (middle) illustrates a spectral signature "S" of or an exemplary target analyte benzene, the spectral signature "S" comprising a number of absorption peaks S1,S2 at respective signature wavelengths Λ1,Λ2. FIG. 2 (bottom) illustrates an exemplary spectrum of output light $L_{R+A}$ of the analyte detector 100 with nano-antennas 11,12 provided the sorption material 11s,12s in the presence of analytes A.

With reference now to FIGS. 2 and 3 aspects of some embodiments, may be described.

In some embodiments, as illustrated in FIG. 2 (middle), a first resonant wavelength range can be completely separated from a second wavelength range (as for the ranges Λ1,Λ2), or there can be a degree of overlap between the ranges (as for the ranges (Λ4,Λ5). By allowing separation between the respective resonance peaks L1,L2, a broad spectral signature can be covered, e.g. in the example of FIG. 3, where the absorption peaks S1,S2 in the spectral signature "S" are also separate, e.g. by more than hundred or even more than five hundred inverse centimeter (cm$^{-1}$).

In other or further embodiments, by allowing some degree of overlap of some or even all of the respective resonance peaks, a contiguous broad range of wavelengths may be covered which may be broader than the wavelength range provided by any single antenna. An effect of covering a broad contiguous range of wavelengths may be that an overlap may be provided for analytes of the spectral signature "S" comprises a number of closely space, or partially overlapping absorption peaks.

For example, FIG. 3 (middle) shows an absorption spectrum of benzene as an example of a target analyte "A". The spectrum is shown between four hundred and four thousand reciprocal centimeter (cm$^{-1}$). In the spectrum, a number of separate absorption peaks are marked S1-S6. For example, as shown in FIG. 2 (middle), a plurality of corresponding resonance peaks R1-R6 can be provided by a plurality of different resonant antenna structures. Of course, not all absorption peaks need to be measured, e.g. it may be sufficient to measure at just two, three or more characteristic wavelength ranges to distinguish an exemplary target analyte "A" from other analytes. Also multiple absorption peaks may be covered by a single resonance peak in some embodiments. For example, as shown, various closely spaced spectral features at S6 may be covered by peak R6 spanning the spectral range Λ6. For example, as shown, spaced spectral features at S4 and S5 may be covered by a covered by a contiguous broad range.

By allowing some degree of overlap of some the respective resonance peaks, a contiguous broad range of wavelengths may be covered which may be broader than the wavelength range provided by any single antenna. For example, some degree of overlap may be provided by separating the respective resonance peaks by a value corresponding to at least five percent of the average of the full width at half maximum HM of the corresponding resonance peaks, as to provide an enlarged range over which the intensity I of the light L is enhanced.

In a preferred embodiment, the wavelength ranges may include ranges relevant to common spectroscopic methods, for example: vibrational spectroscopy, e.g. infrared spectroscopy (IR) with wavenumber range between two hundred and four thousand reciprocal centimeter (cm$^{-1}$), e.g. wavelength range between 2-50 μm, and/or far IR spectroscopy (FIR) with wavelength range five micrometer and one millimeter, and/or near IR spectroscopy (NIR) with wavelength range between 780 nanometer and 2.5 micrometer. Some resonance peaks may be separated by a value of at least ten percent with respect to the central wavelength of one of the two, or at least twenty-five percent, or at least fifty percent, or more, for example in a range between five and two hundred percent to provide an increased range with increased width or even provide effectively separated enhancement ranges at different wavelength ranges. Alternatively, resonance peaks may be separated by a value of at least 50 nm, or at least 100 nm, or at least 200 nm, or at least 500 nm, for example in a range between 50 and 1000 nm. In other words, the detector 100 comprises a multitude of nano-antennas wherein an individual antenna N has a resonance $R_N$ covering a wavelength range $\Lambda_N$ that is different from resonance $R_{N+1}$ from antenna N+1, to cover a broad range of wavelengths. Preferably, such intensity enhancement may be provided over a broad range of wavelengths and/or a plurality of wavelength ranges by providing a number of antennas in excess of 2, or 3, or 4, or 5, or 6, or even more, for example in range between 3 and 10. Where by the location of absorption peaks for one or more target analytes A may determine the number and width of desired enhancement ranges. As described above, the exact location and/or width of said resonances may be controlled by parameters including buy not limited to antenna material selection, antenna dimension, antenna geometry, and antenna orientation.

In another or further preferred embodiment, a detector may be provided wherein the resonant nano-antenna is provided with a geometry and dimension such that the resonance covers a wavelength range, e.g. Λ1 and/or Λ2, that overlaps with a specific spectroscopic absorption band, e.g. S1 and/or S2 respectively, of a target analyte "A". One effect of providing an antenna of which a resonance covers a wavelength range A that overlaps with a specific spectroscopic absorption band of a target analyte "A" may be that such analyte may be detected with an improved sensitivity.

Preferably, multiple antennas, optionally all the antennas in the analyte detector 100, are arranged to provide a resonance range to cover a spectral signature "S" of one or more target analytes, e.g. to cover the spectroscopic absorption bands of one or more target molecules. For example, the multitude of antennas may be arranged to enhance the intensity in a range covering certain specific vibrational absorption bands of analytes, for example a range covering absorption bands indicative for the presence of carbonyl groups (e.g. C═O), amine groups (e.g N—H), or (e.g. C—O) bonds such as alcohols or ethers, or bands relating to skeletal carbon information, for example saturated of unsaturated carbon-carbon bonds (e.g. C—C or C═C). An effect of covering the spectral signature "S" of one or more target analytes may be that when a detector 100 is used in a spectroscopic measurement of a sample comprising a number of analytes, the measurement may provide information for qualification, e.g. identification, and quantification, e.g. determining a concentration, of said analytes.

Figure 4A:
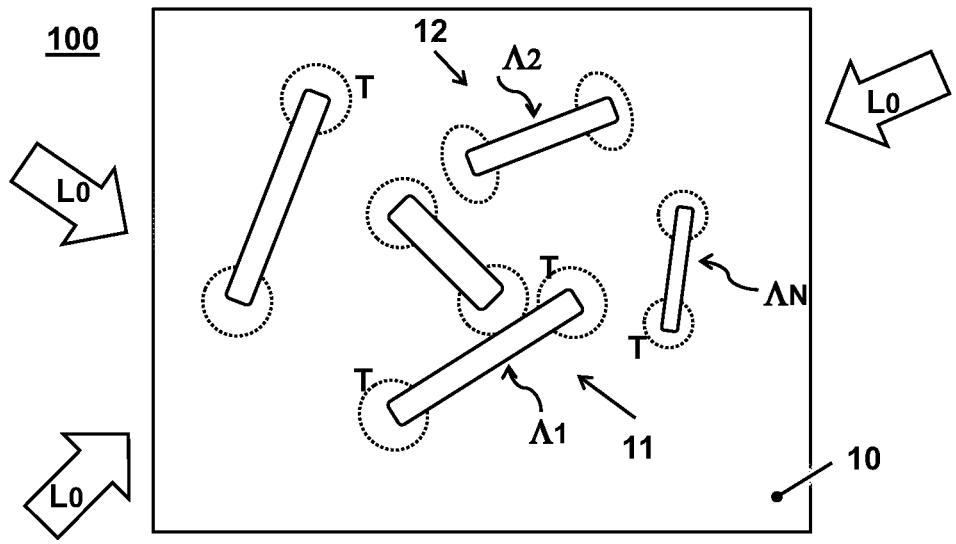
FIGS. 4A-4C illustrates exemplary antenna geometries and alignments.
Figure 4B:
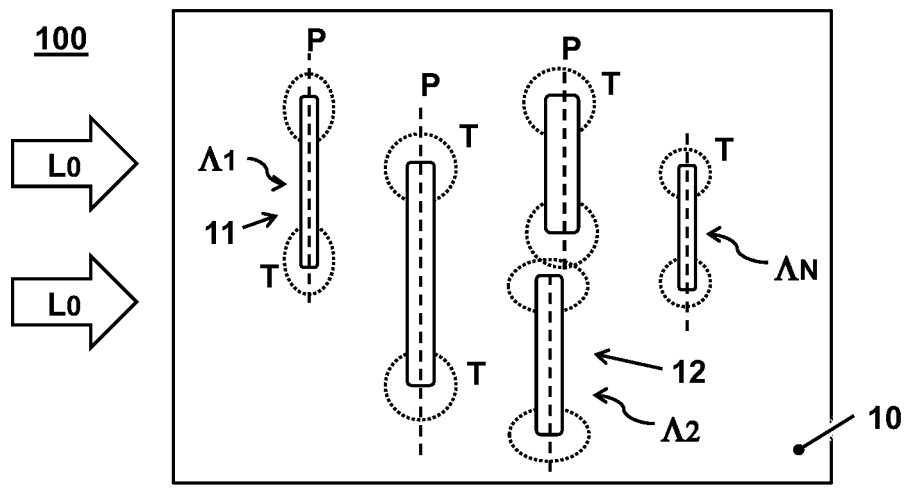
Figure 4C:
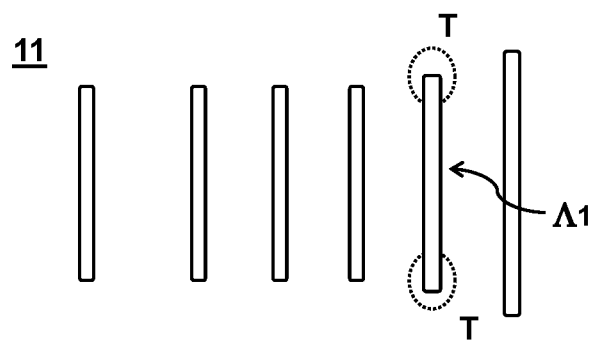

FIG. 4 is a top-view schematic illustration of exemplary antenna geometries and alignments with respect to each another and source light L0. FIG. 4A illustrates a analyte detector 100 wherein a substrate 10 is provide with a plurality of randomly oriented nano-antennas 11,12 to resonantly interact with source light L0 over a wavelength range Λ1, Λ2 to cause a locally concentrated field "Ec" around a respective target location T. Alternative to a random arrangement, the antennas can also be organized in a pre-defined lattice, so that the scattered fields constructively interfere to achieve larger field enhancement. FIG. 4B illustrates a analyte detector 100 wherein the nano-antennas 11,12 are disposed with a principal axis P along a direction perpendicular to the incident source light L0. FIG. 4C illustrates a nano-antenna 11 provided in a so-called Yagi-Uda arrangement.

In other or further embodiments, for example as shown in FIG. 4A-C, the nano-antenna may be provided with a anisotropic geometry to preferentially enhance the intensity of source light L0 of a certain incident direction. For example, the shape of the nano-antenna comprises a beam, rod or wire. One effect of providing an antenna with a beam, wire, or shape is that such shape is especially suited for resonantly enhancing the intensity of light L incident in a direction perpendicular to a principal axis P of the antenna. While the schematic figures may show light travelling parallel to the substrate, in most preferred embodiments, light impinges perpendicular (or at an angle) to the substrate where the antennas are deposited. This may be less demanding from an integration point of view. In any case it is preferred that the polarization of light is parallel to the axis for a rod like geometry. Optionally, the antenna may have a length corresponding to a wavelength light of source light L0, which may be enhanced. For example, the nano-antenna may have a length in a range between three hundred nanometer and fifty micrometer, in a range between one micrometer and ten micrometer, in a range between two micrometer and five micrometer, for example three micrometer. A diameter or cross-section of the nano-antenna may be in a range between 0.8 and 0.01 times the length of the antenna, alternatively in a range between, alternatively in a range between 0.5 and 0.02 times the length of the antenna, alternatively in a range between 0.1 and 0.05 times the length of the antenna. For example, the nano-antenna may be a rod of three micrometer length and five hundred nanometer diameter.

Alternatively, in some embodiments, e.g. as shown in FIG. 4C, a resonant antenna may comprise a plurality of separate elements, for example dots or rods, which together form single resonant antenna. In other words, an antenna may be formed by an array of elements, e.g. dots. Optionally, the plurality, or part of the plurality of resonant nano-antennas may be disposed onto the substrate 10 with their principal axis P oriented in a parallel or random fashion as shown. One advantage of disposing the plurality of resonant nano-antennas oriented in a parallel fashion onto the substrate 10 may be that more efficient interaction between the source light L0 and nano-antennas 11,12 may be achieved by using polarized light L0.

In one embodiment the nano-antennas 11,12 are exposed to a first beam of source light L0 having a first polarization, wherein the nano-antennas 11,12 are oriented to exclusively or predominantly absorb source light L0 having the first polarization. In another or further embodiment, the the nano-antennas 11,12 are exposed to second beam of source light L0 having a second polarization, perpendicular to the first polarization. In some embodiments, respective resulting signals of the first and second beams of light source light interacting with the nano-antennas 11,12 are measured. In a preferred embodiment, the signals resulting from the second beams of light source are used as reference. For example, when measuring with the polarization parallel to the nano-antenna direction, the signal can be amplified; when measuring perpendicular, there may be no amplification and the reference signal is measured. This can reduce the influence of drift and fluctuations in light source and detector significantly. For example, due to sensitivity of the response to antenna geometry and coating thickness, the response can differ at various location on a sample. Changing polarization keeps the location and intensity of the beam constant.

Optionally, the resonant nano-antenna 11 may be laid-out in an array or arrangement to provide a high gain antenna at a certain wavelength range. For example, a high gain array such as a Yagi-Uda antenna, as shown in FIG. 4C. Optionally, the detector 100 may be provided with a plurality of high gain antennas. For example, the plurality of resonant nano-antennas may be a series of nearly parallel beams or wires, preferably with differing lengths, to resonantly interact with the source light L0 incident from a direction perpendicular to the principal axis of said nano-antennas. Aligning the nano-antennas, e.g. providing the substrate with a plurality of nano-antennas formed by parallel beams or wires may have the advantage that the scattered field can be engineered to constructive interfere and yield larger field enhancement, therefore improving the detection limit.

Figure 5:
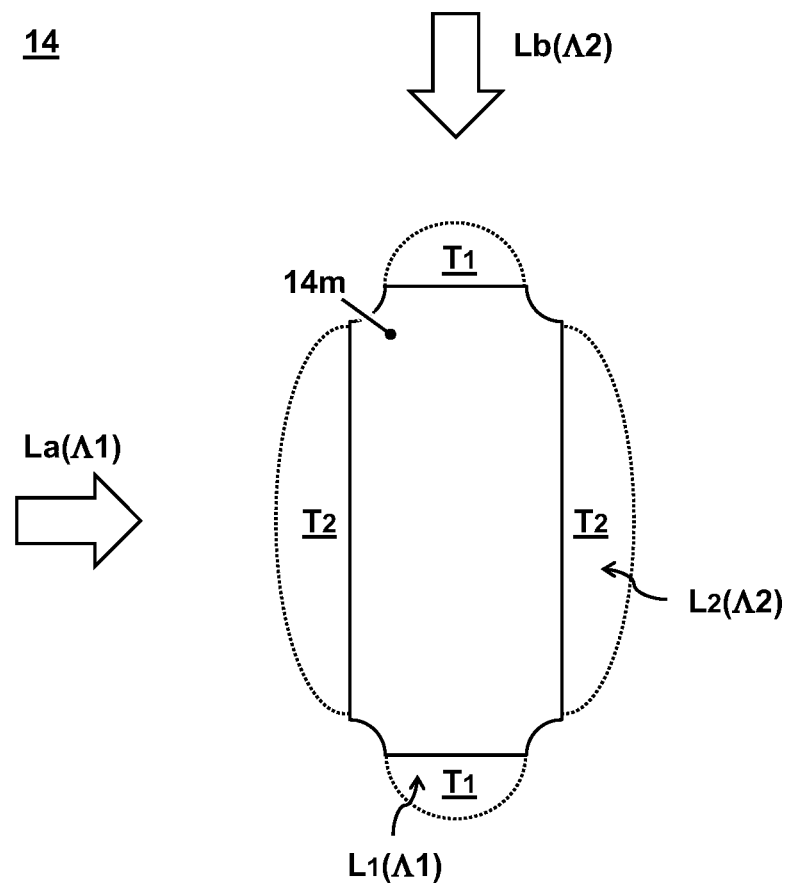
FIG. 5 illustrates an antenna interacting with source light from different directions or polarizations.

FIG. 5 schematically depicts a top view impression of a nano-antenna 14 configured to interact with source light at two wavelength ranges Λ1 and Λ2. In other or further embodiments, e.g. as shown, a analyte detector 100 may be comprising a nano-antenna 14 comprising a antenna material 14m to interact with the light L and wherein the nano-antenna 14 is configured to resonantly interact with source light L near a respective antenna surface and wherein the nano-antenna 14 supports a first resonance L1 in a first direction; and a second resonance L2, in a second direction, different from the first direction. Accordingly light covering a first wavelength range Λ1 with a polarization in the first direction, and light covering a second wavelength range Λ2, different from the first wavelength range Λ1, with a polarization in the second direction may both interact with the same antenna. By providing an antenna such that it comprises more, for example two, characteristic elements an effect may be that the nano-antenna 14 may be suited provide a locally concentrated field "Ec" for multiple, e.g. two, frequencies. One effect of providing an antenna with a structure configured to have a resonance covering at least two separated wavelength ranges is that light L from two distinct sources La, Lb, or light from a broadband source, may be enhanced on a small surface area. By providing an antenna configured to have a resonance covering at least two separated wavelength ranges, the sensor detector 100 may be used in a spectroscopic measurement, wherein spectroscopic absorption information of multiple methods is combined, e.g. combining spectroscopic information based on IR and RAMAN spectroscopy.

Figure 7:
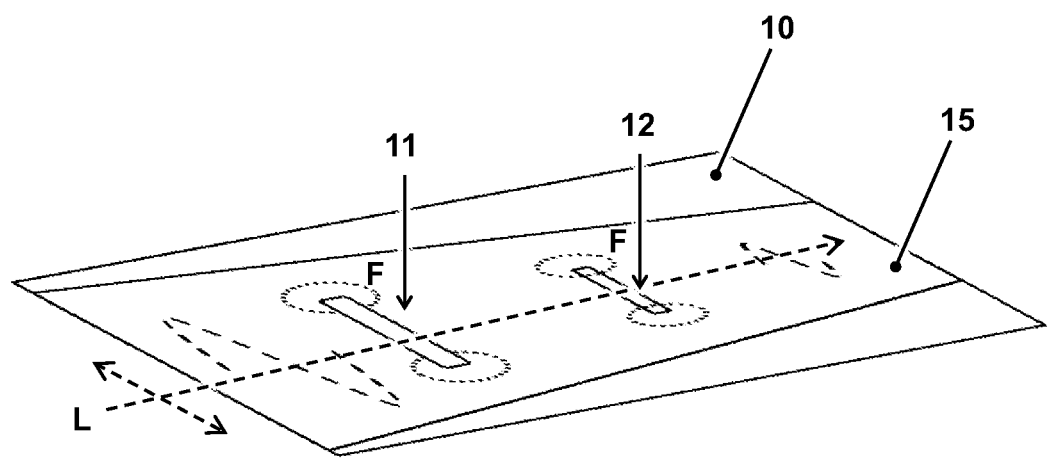
FIG. 7 schematically illustrates a perspective view of an analyte detector comprising a tapering wave guide.

FIG. 6 schematically depicts side view cross sections of exemplary analyte detectors 100 configured for various operation modes. FIG. 6A relates to an exemplary analyte detector 100 configured for operation in transmission mode. FIG. 6B relates to an exemplary analyte detector 100 configured for operation in reflection mode. FIG. 6C relates to an exemplary analyte detector 100 configured for operation with an evanescent field EF from a waveguide. FIG. 6D relates to an exemplary analyte detector 100 comprising a metal layer 40, configured for operation with surface plasmon resonance SPR. FIG. 7 provides a schematic birds-eye view of an exemplary analyte detector 100 provided with a tapering wave guide for source light L0. As shown, the sorption layer 11s can be provided on the antennas 11, the substrate 10, or both. In some embodiments, such as FIGS. 6B and 6D, there may be a strong field enhancement exactly in the sorption layer sandwiched between antennas and metal reflector/film. The sorption layer on the antenna or substrate may also act as a dielectric separator between the antenna and e.g. a metal reflector (FIG. 6B)

Now with reference to FIGS. 6 and 7, aspects of some embodiments, of detector 100 will be described. In some embodiments a analyte detector 100 is provided wherein the substrate is configured with a transparent region to allow the source light L0 to pass through the substrate 10, for example, in one embodiment as shown in FIG. 6A. By providing a detector 100 on a transparent substrate 10, light L may interact with a resonant nano-antenna and may pass through the substrate 10, for example, in a direction towards a detector 30. In another or further embodiment, e.g. as shown in FIG. 6B, A detector 100 may be configured with a reflective region e.g. separated by a dielectric spacer from the nano-antenna. The spacer could also be a concentrating coating. In this configuration the light-matter interaction can be engineered to attain a strong field enhancement in the spacer layer. This configuration may benefit from constructive interference of light scattered by the antennas and reflected by the reflective region, therefore boosting the local field enhancement, which may lead to improved signal quality and/or lowered detection limit for analytes A.

In some embodiments, e.g. as shown in FIG. 6C and FIG. 7, the substrate 10 comprises an optical wave guide 15 configured to direct the light L in a direction towards the nano-antenna 11. For example, the optical wave guide 15 may be a planar waveguide, e.g. as shown in FIG. 6C. Alternatively, the optical wave guide 15 may be an optical fiber (not shown). Preferably, the optical wave guide 15 is dimensioned such that it is suited to propagate light L with a wavelength range Λ that overlaps with the spectroscopic absorption bands of one or more target analytes A. In another or further embodiment the optical wave guide 15 is a multimode waveguide. For example, by providing a waveguide in direction of the propagating light L with a cross-section dimension that is much larger than the wavelength of therein propagating light L, the optical wave guide 15 may be suited to propagate more than one propagation mode, e.g. broad wavelength ranges Λ. For example, when the detector 100 is used with a light source 20 that emits light in the a wavelength range suited to IR spectroscopy, e.g. in a range between 2 µm and 50 µm, the waveguide may, for example, be provided with a dimension ranging between 10 and 1000 µm, or alternatively between 50 µm and 100 µm. One additional effect of providing a optical wave guide 15 with a dimension that is much larger than the wavelength of therein propagating light L the optical wave guide 15 may be that in-coupling of light from light source 20 may be simplified. For example using simplified connections and/or lower-cost light sources 20, such as light-emitting diodes 21 LEDs and vertical-cavity surface-emitting lasers 22 VCSELs. In other or further preferred embodiments the waveguide comprises a tapered region, wherein the tapering is provided along a direction of the propagating light L. Advantageously, the dimensions of the wave guide in the tapered region may be provided to correspond to an resonance mode of the nano-antenna 11, e.g. the optical wave guide 15 may be tapered to have a single mode resonance for the resonant wavelength range Λ1,Λ2 at a location of the corresponding nano-antennas 11,12. For example, the width and/or depth of the wave guide 15 at a location of a nano-antenna are configured to match the resonance frequency of the waveguide to the resonance frequency of the antenna. Tapering of the optical wave guide 15 may be provided by changing one or more of the width and the thickness of the waveguide, e.g. changing the dimensions of the optical wave guide 15 in a direction along the substrate and/or changing the dimensions in a direction away from the substrate. Alternatively, the at least one substrate 10 may be provided with a multitude of single mode waveguides. In other words, waveguides which have a single mode for guiding the light, e.g. not tapered wave guides. The multitude of wave guides may be configured to cover a part, or the whole, of spectral signature S of target analyte A. Preferably, each waveguide is provided with a corresponding resonant antenna. The multitude of waveguides may be coupled to a single light source 20, alternatively one or more sub sets of the multitude of single mode waveguides may be coupled to separate light sources (20).

In some preferred embodiments the analyte detector 100 is provided, wherein the substrate 10 comprises an optical wave guide 15 and wherein the resonant nano-antennas 11,12 are arranged in a direction transverse to a length of the waveguide. Alternatively the nano-antennas (11,12), may be provided in other arrangements, e.g. in a direction along the waveguides.

In other or further embodiments, e.g. as shown in FIG. 6D the substrate 10 may be provided with a metal layer 40, located at least in part between the substrate 10 and the nano-antennas 11, wherein the metal layer 40 is configured to expose the first nano-antenna 11 to a surface plasmon resonance SPR resulting from an interaction of the propagating light L with the metal layer 40. One effect of providing the substrate 10 with a metal layer 40 is that the electron density in the antennas may be controlled via an electric bias.

In some preferred embodiments a detector 100 is provided wherein the substrate 10 comprises an optical waveguide 15 and wherein the resonant nano-antennas 11,12 are disposed in a direction transverse to the propagating light L. One effect of orienting the resonant nano-antenna 11 is a direction transverse to the propagation light L may be that coupling of the nano-antenna 11 and a intensity of the light L may be improved.

Figure 8A:
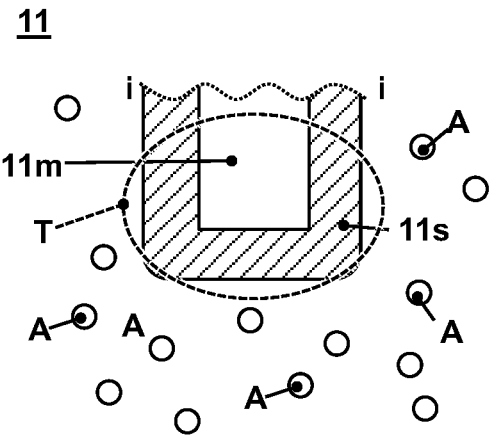
FIG. 8A-8D schematically illustrate exemplary antennas provided with sorption material interacting with analytes.
Figure 8B:
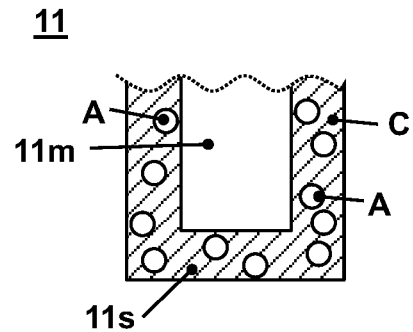
Figure 8C:
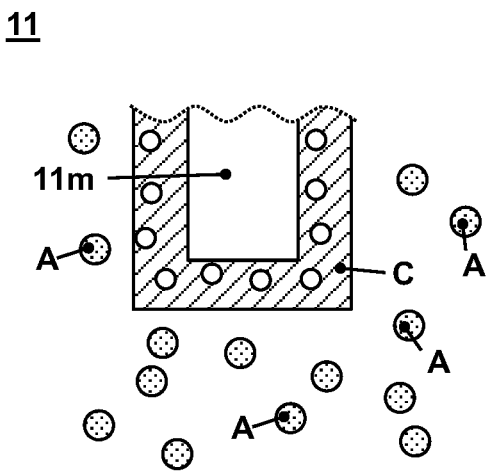
Figure 8D:
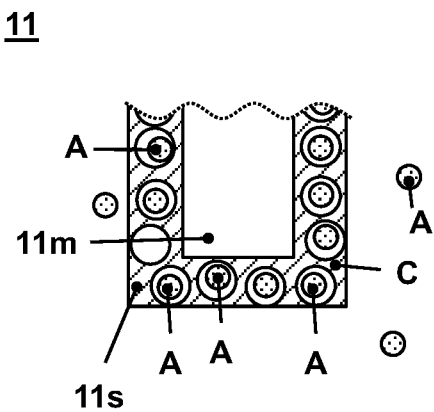

FIG. 8A-D depict schematic close-up representations of the end-section of an exemplary nano-antenna 11 coated with a sorption material 11s around the target location T and a number of target analytes A interacting with the sorption material 11s. FIG. 8A illustrates a nano-antenna 11 coated with a sorption material 11s and a number of target analytes A with low affinity for the sorption material. FIG. 8B illustrates a nano-antenna 11 coated with a sorption material 11s and a number of target analytes A being absorbed in the sorption material. FIG. 8C illustrates a nano-antenna 11 coated with a porous sorption material 11s and a number of target analytes A with a diameter larger than the pore diameter of the sorption material. FIG. 8D illustrates a nano-antenna 11 coated with a sorption material 11s and a number of target analytes A adsorbed in the pores of the sorption material.

In one embodiment, e.g. as shown in FIG. 8D, a detector 100 is provided, wherein the sorption material 11s, 12s is provided in a layer that at least in part covers the nano-antenna surface at a location around the respective target location T. In a preferred embodiment, the sorption material 11s,12s has a high capacity for sorption of one or more analytes A. Preferably, the sorption material 11s,12s is provided in a layer with a thickness corresponding to a volume with enhanced intensity, e.g. the respective target location T1. For example, the sorption material may be provided in a layer with a thickness wherein the layer overlaps the volume with enhanced intensity up to a point wherein the enhanced intensity is 5 percent of the intensity of the enhanced intensity at a location at antenna surface. By providing the nano-antenna with an layer of sorption material 11s,12s that overlaps with an larger portion of the enhanced intensity a larger amount of analytes A may interact with locally concentrated field "Ec". By providing the nano-antenna with an layer of sorption material 11s,12s with a high capacity for sorption of one or more analytes a larger amount of analytes A may interact with the enhanced intensity field. Optionally, the layer of sorption material 11s,12s fully covers the nano-antenna. Alternatively or in addition, the sorption material 11s,12s may also be disposed at a location between the substrate 10 and the nano-antenna. Alternatively, or in addition, the sorption material 11s,12s may be provided as a layer that at least in part covers the substrate 10.

In some preferred embodiments, e.g. as shown in FIGS. 8B and 8D, the sorption material 11s,12s is suited to sorb the one or more analytes A by one or more of absorption and adsorption. For example, the sorption of analytes A may be achieved by dissolution, e.g as shown in FIG. 8B. Alternatively, sorption of a specific target analyte "A" may be achieved by a sorption material 11s,12s that is provided with suitable bonding elements, for example chemically reactive groups, for adsorbing a specific target analyte "A". In another or further preferred embodiments, e.g. as shown in FIG. 8D sorption of analytes A may be achieved by a sorption material 11s,12s that is provided with a surface area suitable for adsorption of target analytes A.

Preferably, the sorption material 11s,12s is a material with a high specific surface area, for example a porous or nano-porous material. The sorption material can also be a polymer that is permeable or that has an affinity towards the analyte. For example, the analyte can be trapped in the free volume of the polymer (between the chains). The sorption material can also be of a "cage-molecule" type. An example is cryptophane or MOF. One effect of providing the sorption material 11s,12s with small pores may be that the capacity of the sorption material 11s,12s to sorb analytes may increase with decreasing pore size. One further effect of using pores may that the adsorption of analytes A may depend on the size of the pores, e.g. analytes with a dimension larger that the size of a pore may not fit in the pore, e.g. as shown in FIG. 8C, and may therefore be excluded from interaction with the enhanced intensity. In other words, the pore size may be used to selectively sorb analytes A. In this way a detector 100 may be provided which, by design may be configured to exclude sensing or detection of a subgroup analytes A.

Preferably, the detector 100 is provided with a sorption material 11s,12s in which the pores are larger than the diameter of the target analytes A. In such sorption material 11s,12s all target analytes A may be adsorbed and the detector 100 may be suitable for detection of all target analytes A. In other words, the sorption material 11s,12s may be an unselective sorption material 11s,12s. In some preferred embodiments the sorption material preferably comprises with small pores to maximize the sorption capacity of analytes A, wherein the diameter of the pores is preferably larger than the diameter of target analytes A. For example, pore size may be selected in a range between an upper value of 200 nanometer, 100 nanometer, 50 nanometer, or 10 nanometer, and a lower value of twenty nanometers, five nanometers, two nanometers, one nanometers or smaller such as 3 Angstrom.

In some embodiments, the target location is provided with an inorganic porous sorption material for sorbing the target analyte to provide a locally increased analyte concentration of the target analyte coinciding with the locally concentrated field of the source light for enhancing the interaction of the source light with the target analyte. In other or further embodiments, different nano-antennas with the same sorption material in their respective target locations are configured to provide respective resonance peaks in different resonant wavelength ranges, e.g. in a wavelength range between 2-50 μm, to overlap different signature wavelengths of the spectral signature in said wavelength range In other or further preferred embodiments, the sorption material 11s,12s is a hydrophobic material. One effect of using a hydrophobic sorption material may be that sorption of water may be reduced. For example, a hydrophobic coating may be provided that for example comprises fluorinated surface groups. Alternatively or in addition, the sorption material 11s,12s comprises one or more polymers suitable for taking up target analytes A. An advantage of using a sorption material 11s,12s comprising a polymer may be that one or more polymers may be selected according the nature of the target analytes A. For example polar polymers, such as polyethylene glycols or the sodium salt of a polyacrylic acid, may be selected to sorb hydrophilic analytes, such as water and ethanol. Accordingly, apolar polymers, such as polyolefins, may be selected to sorb apolar analytes. Alternatively or in addition, the sorption material 11s,12s may comprise one or more non-polymeric organic compounds with a low vapor pressure for taking up target analytes A, such as ionic liquids.

In some preferred embodiments, the sorption material 11s,12s comprises an inorganic porous material for taking up target analytes A. An advantage of using an inorganic material is that the sorption material 11s,12s may be selected to have no, or weak, spectroscopic adsorption bands overlapping with wavelength ranges of resonant nano-antennas. This may have the effect that interference of the sorption material 11s,12s with target analytes A during the spectroscopic measurement may be reduced. For example, suitable inorganic sorption materials include but are not limited to zeolites, porous silica, porous alumina, or organic sorption materials as metal organic frameworks (MOF) and/or combinations thereof.

In other or further preferred embodiments, a detector 100 is provided wherein the first nano-antenna 11 is provided with a first sorption material 11s and the second nano-antenna 12 is provided with a different, second sorption material 12s. Preferably, the first sorption material and second sorption material may be configured to preferentially sorb separate sub-groups of target analytes A. By providing the first and second nano-antennas 11,12 with different coatings a detector 100 may be provided that may have increased sensitivity towards separate sub-groups of target analytes A.

Figure 8E:
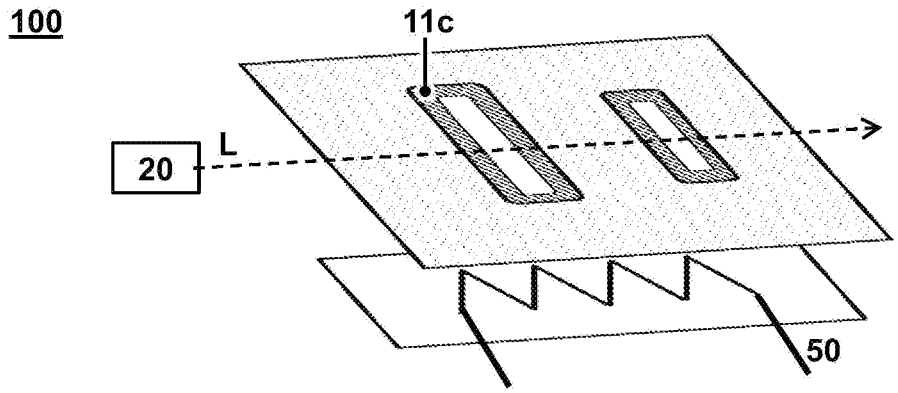
FIG. 8E schematically illustrates a perspective view of an analyte detector provided with a heating element.

FIG. 8E provides a schematic perspective view of an exemplary analyte detector 100 provided with heating element 50.

In some embodiments, a detector 100 is provided that comprises a heating element to increase the temperature of the sorption material 11s,12s for desorbing the greater part of the one or more analytes A from sorption material 11s,12s. By raising the temperature of sorption material 11s,12s above a desorption threshold an effect may be that sorbed analytes A may desorb from the sorption material 11s,12s. An effect of desorbing analytes A from the sorption material 11s,12s may be to enable the recording of a baseline measurement for the spectroscopic measurement, e.g. to provide the detector 30 with a calibration value.

In some preferred embodiment, e.g. as shown in FIG. 8E, the temperature of the sorption material 11s,12s may be increased or decreased by a heating/cooling heating element 50 positioned at a location near the sorption material 11s, 12s. In other or further preferred embodiments the sorption material 11s,12s may be heated by a part of the energy of a pulse of light. By directing a pulse of radiation to the sorption material 11s,12s an effect may be that part of the energy of this pulse is adsorbed by the sorption material 11s,12s. The amount of energy that is transferred to the sorption material 11s,12s may be controlled by controlling one or more of the pulse duration, the light L intensity and wavelength of the light L. The pulse of radiation may advantageously be provided by a light source 20. Alternatively a separate second light source may be provided.

In some embodiments the analyte detector (100) may be provided with a cooler to decrease the temperature of the sorption material (11s,12s). Cooling the sorption material may increase the sorption of the one or more analytes (A) in the sorption material (11s,12s), e.g. increase the affinity of the target analyte (A) to the sorption material (11s,12s), and/or increase the capacity of the sorption material for sorbing analytes.

In some preferred embodiments, the detector 100 is used for detection of target analytes A. Preferably the target analytes comprise one or more of: gasses, vapors, aerosols, and airborne particles, or a mixture thereof. For example, the gasses may be selected from one or more of carbon dioxide, carbon monoxide, nitrogen oxide, nitrogen dioxide, and ozone, or a mixture thereof. For example, the vapors may be selected from one or more of humidity and volatile organic components VOCs or a mixture thereof. For example, the volatile organic comprise one or more of toluene, benzene, and xylene. For example, the airborne particles may comprise: small particulate matter, such as PM2.5; soot; or allergens, such as spores or pollen or combinations thereof. Preferably the analyte detector 100 may be used for indoor or outdoor air quality control. Ideally a spectral signature of the sorption material doesn't overlap with the fingerprint of the analyte.

Some embodiments of the analyte detector 100 may be used in a method for detecting the presence of target analytes A. The method may comprise e.g. one or more of exposing the detector 100 to target analytes A; exposing the plurality of nano-antennas to source light L0 from light source to form a locally concentrated field "Ec" near a respective target location 11s,12s; receiving the light $L_{A+D}$ after interacting with the plurality of nano-antennas in detector 30; converting an optical energy of the received light $L_{A+D}$ within the first wavelength range Λ1 to an electrical signal ES1; converting an optical energy of the received light $L_{A+D}$ within the second wavelength range $Λ_2$ to an electrical signal ES2; receiving the electrical signals in spectrum analyzer 70 and comparing the electrical signals to electrical signals of reference analytes; optionally increasing the temperature of the sorption material 11s,12s for desorbing the greater part of the one or more analytes A from sorption material 11s,12s for regeneration the sorption material 11s,12s. By recording electrical signals ES an absorption spectrum may be constructed comprising elements as absorption peaks which characteristic wavelengths and intensities which may be characteristic for the target analytes A. In other words, the absorption spectrum may provide a finger-print signature which may be characteristic for individual target analytes A and mixtures of target analytes A. By comparing peak positions in a recorded absorption spectrum to a database of adsorption spectra comprising peak positions of known target analytes A, the presence of a target analyte "A" may be confirmed. In other words, the detector 100 may allow the detection of target analytes within a gaseous sample, e.g. qualification of target analytes A. By comparing peak intensities in a recorded absorption spectrum to a database of absorption spectra, comprising peak intensities of reference compounds, the presence of a target analyte "A" may be confirmed. In other words, the detector 100 may allows the detection of target analytes within a gaseous sample, e.g. qualification of target analytes A. By desorbing analytes A from sorption material 11s,12s the detector 100 may be regenerated for a subsequent use.

In some preferred embodiments the method comprises measuring a spectrum of light (LR+A) including the signature wavelengths (Λ1,Λ2) emanating from the at least one substrate with nano-antennas (11,12) after the source light (L0) interacting with the nano-antennas (11,12) and the target analyte (A) at the target locations (T1,T2).

Some embodiments of the analyte detector 100 may be used in a method for detecting and quantifying the amount of target analytes A. The method for detecting and quantifying the amount of target analytes A comprises the elements of the method for detecting the presence of target analytes further and a further step of comparing peak positions and peak intensities of a recorded absorption spectrum a database of adsorption spectra of reference analytes recorded of a sample with a known concentration In other or further embodiments the step of increasing the temperature of the sorption material 11s,12s for desorbing the greater part of the one or more analytes A from sorption material 11s,12s is preferably applied before exposing the plurality of nano-antennas to source light L0. One effect of desorbing the greater part of the one or more analytes A from sorption material 11s,12s before exposing the plurality of nano-antennas to source light L0, may be that the detector may be used to record a baseline measurement. The baseline measurement may be recorded to provide a calibration measurement, preferably for a low concentration of target analyte "A", more preferably in the absence of analyte "A".

The analyte detector 100 may be manufactured in a process for manufacturing the detector 100 comprising: solution phase synthesis of nano-antennas; deposition of formed nano-antennas on a substrate, wherein the deposition step may comprise the use of a template suited for the deposition of a plurality of nano-antennas. Optionally, the deposition step may comprise the use of a patterned means, e.g. a stamp, suited for the deposition of a plurality of aligned nano-antennas, e.g. parallel nano-antennas. Optionally, the solution phase synthesis of nano-antennas may be followed by a purification or separation phase, wherein nano-antennas with dimensions having a first resonance L1 covering a first wavelength range $\Lambda_1$, and nano-antenna 12 with dimensions having a second resonance $R_2$ covering a second wavelength range $\Lambda_2$, different from the first wavelength range $\Lambda_1$ may be separated from antennas not having suitable resonances. Optionally, the solution phase synthesis step is followed by a process step comprising a solution-based coating step for coating the nano-antennas with the sorption material 11s,12s. For example, forming a core-shell structured nano-antenna. Alternatively, the sorption material 11s,12s may be deposited the substrate in a process step before deposition of the nano-antennas thereon. Alternatively, the sorption material 11s,12s may be deposited in a process step after depositing the antennas on the surface.

Preferably, the template may be configured to deposit the nano-antennas onto the substrate from a liquid phase. In another or further preferred embodiment of the process, the template comprises a slot or a plurality of slots wherein the dimension of slots matches the dimension of an antenna. By providing the means for the deposition of nano-antennas with a slot with a dimension matching the dimension of an antenna, an effect may be that the slot preferentially allows the deposition of an antennas of matching dimensions. By providing the means for the deposition of nano-antennas with a plurality of slots, an effect may be that the slot preferentially allows the deposition of a plurality of antennas in an arrangement on the substrate that matches the arrangement of slots in the deposition means. For example, the means may be used to deposition a plurality of parallel slots. By providing the means with slots with differing dimensions, an effect may be the deposition of a plurality of nano-antennas with differing resonances. Alternatively, or in addition nano-antennas may be provided using lithographic methods, e.g. direct write methods, e-beam methods. Alternatively, nano-antennas may be provided using additive deposition methods, e.g. printing methods.

For the purpose of clarity and a concise description, features are described herein as part of the same or separate embodiments, however, it will be appreciated that the scope of the invention may include embodiments having combinations of all or some of the features described. For example, while embodiments were shown for a method of detection of analytes as well as analyte detector 100, also alternative ways of devices may be envisaged by those skilled in the art having the benefit of the present disclosure for achieving a similar function and result. E.g. the device may be combined or split up into one or more alternative components. The various elements of the embodiments as discussed and shown offer certain advantages, such as offering the ability to quantify and quantify the presence of analytes within a mixture comprising a multitude of constituents. Of course, it is to be appreciated that any one of the above embodiments or processes may be combined with one or more other embodiments or processes to provide even further improvements in finding and matching designs and advantages. It is appreciated that this disclosure offers particular advantages to analyte detection and quantification, and in general can be applied for any application benefiting from analyte detection and quantification.

Figure 9A:
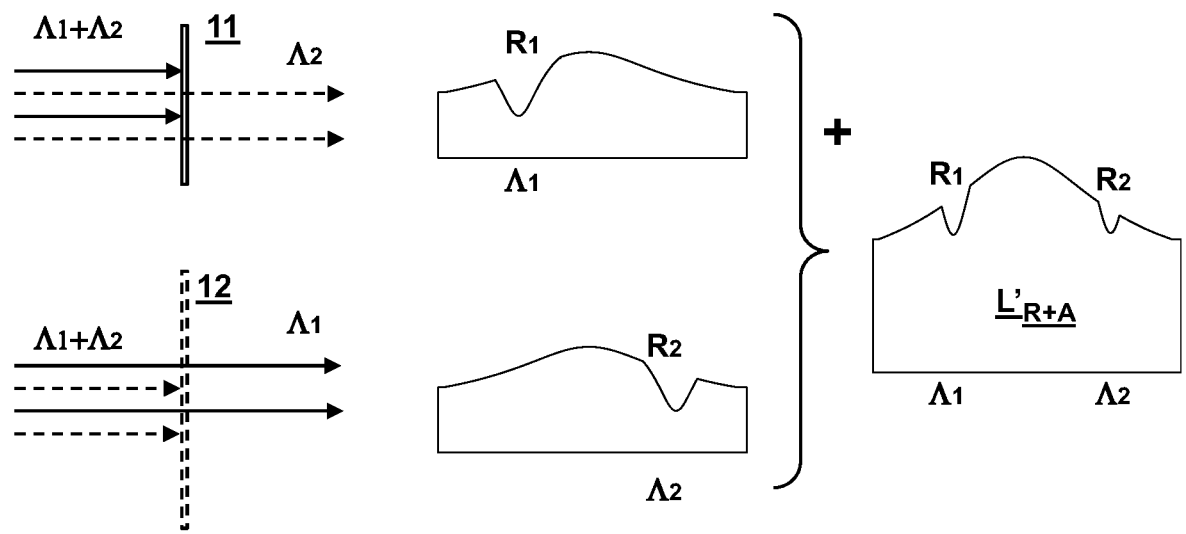
FIG. 9A schematically depicts the simultaneous interaction of a source light with nano-antennas arranged in a parallel way.
Figure 9B:
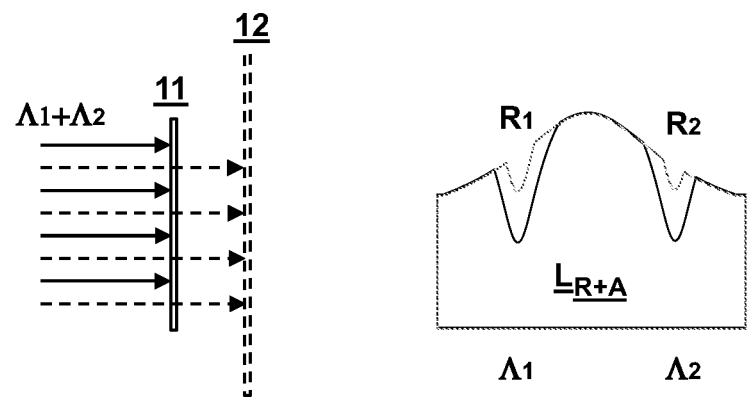
FIG. 9B schematically depicts the consecutive interaction of a source light with nano-antennas arranged in series.

Without being bound by theory the improvement of signal quality may be achieved by having the same light interact with multiple different antennas. For example, this case all, or at least a greater part of the light interacts with the light, whereas a smaller fraction of the light interacts with the antennas in the case that the signal is formed a combination of two fractions, the first of which is allowed to interact with a first antenna and the second of which is allowed to interact with a second antenna. This effect is illustrated in FIGS. 9A and B. FIG. 9A illustrates nano-antennas 11,12 arranged in a parallel fashion, being exposed to source light L0 comprising resonant wavelength ranges $\Lambda 1, \Lambda 2$ having. As explained here above, a fraction of the source light interacts with the first nano-antennas 11 having a resonance R1 at a resonant wavelength range $\Lambda 1$, and a different fraction of the source light interacts with the second nano-antennas 12 having a resonance R2 at a different resonant wavelength range $\Lambda 2$. After interacting with the respective nano-antennas 11,12 the spectrum of the combined light L'R+A comprises information of the respective resonances at resonant wavelength ranges $\Lambda 1$ and $\Lambda 2$, albeit with a relatively low signal to noise ratio, since a portion of the light at said ranges did not interact with the corresponding nano-antenna. FIG. 9B illustrates nano-antennas 11,12 arranged to sequentially receive the source light L0 comprising resonant wavelength ranges $\Lambda 1$ and $\Lambda 2$. As explained here above, the whole of the source light may interact with the first and second nano-antennas 11,12 having resonances R1 and R2 at resonant wavelength ranges $\Lambda 1$ and $\Lambda 2$. After interacting with both nano-antennas 11,12 the spectrum light LR+A comprises information of the respective resonances at resonant wavelength ranges $\Lambda 1$ and $\Lambda 2$. Compared to the spectrum in FIG. 9A, an improved signal to noise ratio is obtained. This may be a result from the arrangement of nano-antennas 11,12 to sequentially receive the source light L0 such that all, or at least the greater fraction, of the source light L0 interacts with both nano-antennas.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims, wherein each claim can in principle refer to any preceding claim unless clearly excluded by context.

The invention claimed is:

1. An analyte detector comprising:
   at least one substrate with a plurality of nano-antennas configured to receive a target analyte with a spectral signature having absorption peaks at different signature wavelengths,
   a light source configured to provide a source light having a source intensity over a source wavelength range including different source light wavelengths for interaction with the target analyte at the different signature wavelengths according to the spectral signature; and
   a light sensor for detecting a spectrum of the different source light wavelengths of the light having interacted with the target analyte at the different signature wavelengths for determining the spectral signature of the target analyte;
   wherein the nano-antennas comprise an antenna material forming resonant antenna structures configured to receive and resonantly interact with the source light to form a respective resonance peak over a resonant wavelength range overlapping a respective signature wavelength of the target analyte,
   wherein the resonant interaction with the source light causes a locally concentrated field of the source light in the resonant wavelength range,
   wherein the locally concentrated field is localized around a respective target location of the nano-antennas and/or substrate;
   wherein the target location is provided with a sorption material for sorbing the target analyte to provide a locally increased analyte concentration of the target analyte coinciding with the locally concentrated field of the source light for enhancing the interaction of the source light with the target analyte;
   wherein different ones of the nano-antennas with the same sorption material in their respective target locations are configured to provide respective resonance peaks in different resonant wavelength ranges to overlap the different signature wavelengths of the spectral signature; and
   wherein the analyte detector further comprises a spectrum analyzer configured to identify the target analyte by a spectral signature of the target analyte in different resonant wavelength ranges.

2. The analyte detector according to claim 1, wherein at least part of the light path is formed by one or more optical wave guides configured to guide the light along one or more different nano-antennas.

3. The analyte detector according to claim 1, wherein light is guided through one or more tapered optical wave guides, wherein the different nano-antennas are disposed at different locations along the waveguides.

4. The analyte detector according to claim 1, wherein the light path is configured to reflect multiple times between substrates to have the light consecutively interact with at least two different ones of the nano-antennas.

5. The analyte detector according to claim 1, wherein the light path is configured to transmit through multiple substrates to have the light interact with at least two different ones of the nano-antennas.

6. The analyte detector according to claim 1, wherein the nano-antennas comprise at least one nano-antenna configured to resonantly interact with the source light to provide:
   a first resonance for a first polarization direction of the source light covering a first wavelength range overlapping a first signature wavelength of the target analyte; and
   a second resonance for a second polarization direction of the source light, differing from the first polarization direction, covering a second wavelength range overlapping a second signature wavelength of the target analyte, different from the first signature wavelength.

7. The analyte detector according to claim 1, further comprising a heater to increase the temperature of the sorption material for desorbing part of the one or more analytes from sorption material.

8. The analyte detector according to claim 1 further comprising a cooler to decrease the temperature of the sorption material for increasing the sorption of the one or more analytes in sorption material.

9. The analyte detector according to claim 1, wherein the different nano-antennas differ from each other by a characteristic size or shape, such as a length or diameter of the nano-antennas, wherein the different characteristic sizes provide the different resonance peaks in different resonant wavelength ranges, wherein the characteristic sizes differ between the said different nano-antennas by at least a factor 1.01.

10. The analyte detector according to claim 1, wherein the respective resonance peaks of different ones of the nano-antennas have peak intensities at different wavelengths, wherein the wavelengths differ by at least a factor 1.01.

11. The analyte detector according to claim 1, wherein at least some of the resonance peaks of different ones of the nano-antennas cover exclusive wavelength ranges, wherein a full width half maximum of a first resonance peak has no overlap with a full width half maximum of a second resonance peak.

12. The analyte detector according to claim 1, wherein at least some of the resonance peaks of different nano-antennas cover partially overlapping wavelength ranges, wherein a full width half maximum of a first resonance peak partially overlaps between 5-95% of a full width half maximum of a second resonance peak.

13. A method of detecting analytes, the method comprising
   providing at least one substrate with a plurality of nano-antennas;
   exposing the at least one substrate with nano-antennas to a target analyte with a spectral signature having absorption peaks at signature wavelengths; and
   exposing the nano-antennas to a source light with a source intensity over a source wavelength range including the signature wavelengths for interaction with the target analyte according to the spectral signature,
   wherein the nano-antennas comprise an antenna material for forming resonant antenna structures that receive and resonantly interact with the source light to form a respective resonance peak over a resonant wavelength range overlapping a respective signature wavelength of the target analyte,
   wherein the resonant interaction causes a locally concentrated field of the source light in the resonant wavelength range,
   wherein the locally concentrated field is localized around a respective target location of the nano-antennas and/or substrate;
   wherein the target location is provided with a sorption material for sorbing the target analyte to provide a locally increased analyte concentration of the target analyte coinciding with the locally concentrated field of the source light for enhancing the interaction of the source light with the target analyte;

wherein different ones of the nano-antennas with the same sorption material in their respective target locations are configured to provide respective resonance peaks in different resonant wavelength ranges to overlap the different signature wavelengths of the spectral signature, and wherein the method further comprises identifying, by a spectrum analyzer, the target analyte by a spectral signature of the target analyte in different resonant wavelength ranges.

14. The method according to claim 13, wherein at least one substrate with a plurality of the nano-antennas is provided by a process comprising solution phase synthesis of the plurality of nano-antennas; and deposition of formed nano-antennas on the at least one substrate wherein the deposition comprises using a template with slots for determining a position and/or direction of the nano-antennas on the substrate.

15. The method according to claim 13, further comprising:

exposing the nano-antennas to a first beam of source light having a first polarization, wherein the nano-antennas are oriented to exclusively or predominantly absorb source light having the first polarization;

exposing the nano-antennas to second beam of source light having a second polarization, perpendicular to the first polarization; and measuring respective resulting signals of the first and second beams of light source light interacting with the nano-antennas, wherein the signals resulting from the second beam of light source are used as reference.

16. The method according to claim 13, wherein, to carry out the exposing the nano-antennas to a source light, the light travels along a light path from a light source to a light sensor with the nano-antennas there between, wherein the light path is configured to allow the light from the light source to interact with at least two different nano-antennas before arriving at the light sensor.

17. The analyte detector according to claim 1, wherein the light travels along a light path from the light source to the light sensor with the nano-antennas there between, wherein the light path is configured to allow the light from the light source to interact with at least two different nano-antennas before arriving at the light sensor.

* * * * *